United States Patent [19]

Peter et al.

[11] Patent Number: 4,644,976

[45] Date of Patent: Feb. 24, 1987

[54] HYDROPNEUMATIC FLOATING-PISTON ACCUMULATOR

[75] Inventors: Gunter Peter, Theley; Siegfried Klett, Affalterbach, both of Fed. Rep. of Germany

[73] Assignee: Gesellschaft fuer Hydraulik-Zubehoer mbH, Sulzbach, Fed. Rep. of Germany

[21] Appl. No.: 718,001

[22] Filed: Mar. 29, 1985

[30] Foreign Application Priority Data

Mar. 29, 1984 [DE] Fed. Rep. of Germany ....... 3411592

[51] Int. Cl.[4] .............................................. F16L 55/04

[52] U.S. Cl. .......................................... 138/31; 73/239

[58] Field of Search ...................... 138/31, 26; 73/239, 73/119 A; 417/540; 137/207; 116/227, DIG. 21; 267/64.28

[56] References Cited

U.S. PATENT DOCUMENTS

| | | | |
|---|---|---|---|
| 3,351,097 | 11/1967 | Moran | 138/31 |
| 3,454,050 | 7/1969 | Wolf | 138/31 |
| 3,559,727 | 2/1971 | Hill | 138/31 |
| 3,657,925 | 4/1972 | Gross | 73/239 |
| 4,307,753 | 12/1981 | Dryer | 138/30 |
| 4,385,297 | 5/1983 | Schmitt et al. | 73/119 A |
| 4,463,603 | 8/1984 | Welker | 73/239 |

FOREIGN PATENT DOCUMENTS

| | | | |
|---|---|---|---|
| 0003925 | 9/1979 | European Pat. Off. | 138/31 |

OTHER PUBLICATIONS

Hydropneumatic Floating-Piston Accumulator, Brochure No. 3.301.6/9.82 of Gesellschaft fuer Hydraulic-Zubehoer mbH.

*Primary Examiner*—James E. Bryant, III
*Assistant Examiner*—Leo J. Peters
*Attorney, Agent, or Firm*—Roylance, Abrams, Berdo & Goodman

[57] ABSTRACT

A hydropneumatic accumulator has a separator piston, movable in the chamber of a housing. A switch member is attached to the separator piston by a support for simultaneous movement. Sensors can be influenced by the switch member position. The switch member is surrounded by a tube member which supports the sensors and is attached to the housing. A filling attachment is provided on the tube member. A filling conduit extends within the tube member and adjacent the support to simplify the configuration of the hydropneumatic accumulator.

10 Claims, 1 Drawing Figure

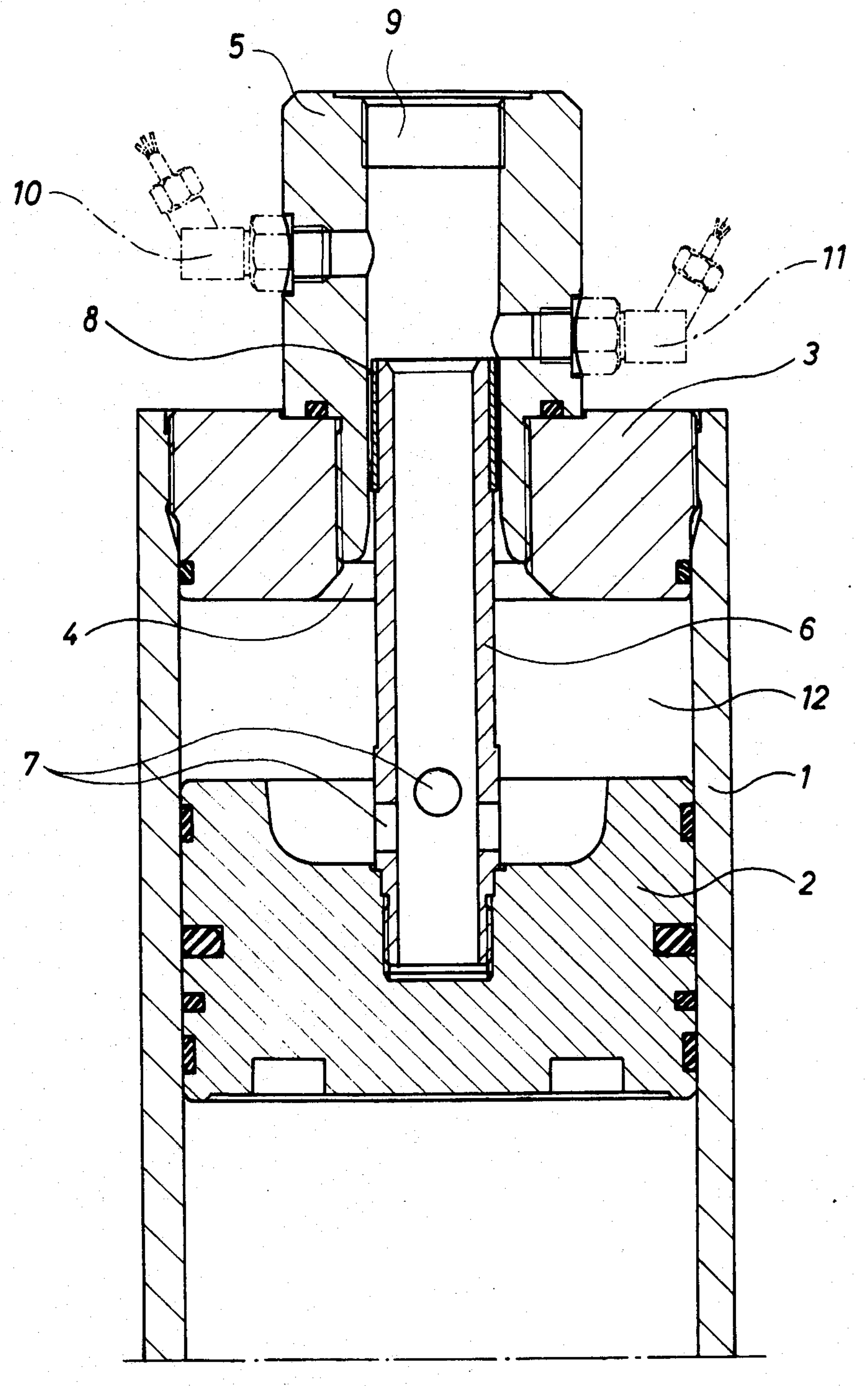
5
9
10
11
8
3
4
6
12
7
1
2

HYDROPNEUMATIC FLOATING-PISTON ACCUMULATOR

BACKGROUND OF THE INVENTION

A conventional floating-piston accumulator has a housing tube and a filling conduit with a filling attachment which are arranged separate from each other on a cover on the accumulator housing end. The conventional arrangement requires two separate bores or holes in the cover. The switch member comprises a magnet, while the sensor is a Reed relay ("Hydropneumatic Floating-Piston Accumulator", Brochure No. 3.301.6/9.82 of Gesellschaft fuer Hydraulik-Zubehoer mbH)

SUMMARY OF THE INVENTION

Object of the present invention involve providing a hydropneumatic floating-piston accumulator with a simpler construction facilitating manufacture, operation and maintenance.

The foregoing objects are obtained by a hydropneumatic accumulator comprising a tubular housing with a chamber, a separator piston movably mounted in the housing chamber, a switch member, a tube member, a filling conduit and a sensor. The switch member is mounted on a support coupled to and extending axially from the piston such that the switch member is spaced from the piston and moves simultaneously with the piston. The tube member is mounted on one end of the housing, surrounds the switch member, and has a filling coupling for attaching a filling device to the tube member. The filling conduit extends through the tube member and adjacent the support for conveying fluid into the chamber between the piston and the tube member. The sensor is mounted in the tube member and senses positions of the switch member in the tube member.

By arranging of filling conduit adjacent to the switch member support, the filling attachment or coupling can be provided on the housing tube. This simplifies the structure of the accumulator housing, particularly of its cover, since only a single bore is required in the cover for the housing tube member and filling attachment.

Preferably, the filling attachment is located on the end of the tube member remote from the housing and the filling conduit extends through the switch member support. If the filling conduit extends outside the switch member support, this support would have a more complicated configuration, as compared with the filling conduit extending inside this support.

The support can be a non-magnetic tubular member with a through hole adjacent its connection to the piston. This further simplifies the structure of the accumulator.

Other objects, advantages and salient features of the present invention will become apparent from the following detailed description, which, taken in conjunction with the annexed drawings, discloses preferred embodiments of the present invention.

BRIEF DESCRIPTION OF THE DRAWING

The sole drawing FIGURE, which forms a part of this disclosure, is a side elevational view, in section, of a hydropneumatic floating-piston accumulator according to the present invention.

DETAILED DESCRIPTION OF PREFERRED EMBODIMENTS

The hydropneumatic floating-piston accumulator according to the present invention comprises a housing 1 configured as a cylinder and closed at one end with a cover. A separator piston 2 of metal, preferably aluminum, separates the liquid (below the piston) from the gas (above the piston). Housing 1 is closed off on one end by a cover 3 threaded into the housing. Cover 3 has a central bore 4. A housing tube member 5 has an insert end threaded into cover bore 4. The clearances between housing 1 and separator piston 2 or cover 3, and between cover 3 and housing tube member 5 are packed or sealed with gaskets.

A tubular switch member support or piston rod 6 of nonmagnetic material, especially aluminum, has a plurality of radially extending through-holes 7 on its end adjacent to separator piston 2. The support is threaded into separator piston 2 to fixedly connect the piston and support. On its end remote from separator piston 2, support 6 supports a switch member or ring 8 of magnetic material, especially of iron. Ring 8 is cylindrical, is mounted on the outer surface of support 6 and is positioned inside housing tube member 5. The ring is mounted in tube member 5 with some lateral play. Depending upon the length of housing 1, switch ring 8 can also leave housing tube member 5.

Housing tube member 5 has internal threads 9 on its end remote from separator piston 2 and housing 1 for engaging a conventional sealing device of a conventional filling device. A filling conduit extends through housing tube member 5 and switch member support 6. Proximity switches 10 and 11 are radially arranged and laterally separated from each other, and are threaded in housing tube member 5. The longitudinal axes of proximity switches 10 and 11 are spaced along the central, longitudinal axis of tube member 5. Switch ring 8 operates proximity switches 10 and 11. The axial length of switch ring 8 can be larger or smaller than the distance between the centers of the threaded attachments for the two proximity switches 10 and 11 along the longitudinal axis of tube member 5. The proximity switches can trip two different switching processes, e.g. for operation of an apparatus and for monitoring of the gas volume in the accumulator.

The sealing device is threaded into internal threads 9 and is sealed, before chamber 12 between separator piston 2 and cover 3 is filled with pressurized gas. Subsequently, the desired pressure is produced in chamber 12 by attachment to the sealing device of a filling device. The floating-piston accumulator is then ready for operation.

The accumulator can be connected, on its side remote from cover 3, to a fluid coupling of a hydraulic work cylinder or the like. During operation, separator piston 2 is moved within housing 1. A signal is produced when switch ring 8 is moved near proximity switch 11. If switch ring 8 is also moved into the range of proximity switch 10, then another signal is produced, which other signal can be used to disconnect the hydraulic system or the like.

Switch member support 6 is configured as a tubular member of quite small transverse dismeter. It can also be provided with a flange on its end adjacent to separator piston for attaching the support to the separator piston.

While various embodiments have been chosen to illustrate the invention, it will be understood by those skilled in the art that various changes and modifications can be made therein without departing from the scope of the invention as defined in the appended claims.

What is claimed is:

1. A hydropneumatic accumulator, comprising:
a tubular housing with a chamber;
a separator piston movably mounted in said chamber of said housing;
a tubular piston rod fixedly coupled to and extending axially from said piston for movement simultaneously with said piston, said piston rod having opposite first and second ends with said first end attached to said piston and said second end remote from said piston;
a switch member mounted on said piston rod at a first distance from said piston;
a tube member mounted on one end of said housing and surrounding said switch member when said separator piston is in a top position thereof, said tube member having filling means for attaching a filling device to said tube member;
a filling conduit extending through said tube member and through said piston rod from said first end of said piston rod for conveying fluid into said chamber between said piston and said tube member, said filling conduit including a bore extending radially through said piston rod adjacent said piston and opening into said chamber; and
sensor means, mounted in said tube member, for sensing positions of said switch member in said tube member.

2. A hydropneumatic accumulator according to claim 1 wherein said filling means is positioned on an end of said tube member remote from said housing.

3. A hydropneumatic accumulator according to claim 1 wherein said piston rod is formed of non-magnetic material, said second end supporting said switch member, said switch member being annular and located on an outer surface of said piston rod, and said sensor means comprises at least one proximity switch.

4. A hydropneumatic accumulator according to claim 3 wherein said sensor means comprises first and second proximity switches with centers spaced by a second distance along an axial direction of said tube member, said switch member having an axial length different than said second distance.

5. A hydropneumatic accumulator according to claim 4 wherein said axial length is greater than said second distance.

6. A hydropneumatic accumulator, comprising:
a tubular housing with a chamber;
a separator piston movably mounted in said chamber of said housing along a piston axis;
a tubular piston rod fixedly coupled to and extending axially from said piston for movement simultaneously with said piston, said piston rod having opposite first and second ends with said first end attached to said piston and said second end remote from said piston;
a switch member mounted on said piston rod at a first distance from said piston;
a cylindrical tube member mounted on one end of said housing and surrounding said switch member when said separator piston is in a top position thereof, said tube member having filling means for attaching a filling device to said tube member and being coaxially arranged relative to said piston axis;
a filling conduit extending coaxially through said tube member and through said piston rod from said first end of said piston rod for conveying fluid into said chamber between said piston and said tube member, said filling conduit including a bore extending radially through said piston rod adjacent said first end and opening into said chamber; and
sensor means, mounted in said tube member, for sensing positions of said switch member in said tube member.

7. A hydropneumatic accumulator according to claim 6 wherein said piston rod is tubular and is formed of non-magnetic material, said piston rod having opposite first and second ends with said first end attached to said piston and with said second end supporting said switch member, said switch member being annular and located on an outer surface of said piston rod, said piston rod having a through-hole adjacent said first end; and said sensor means comprises at least one proximity switch.

8. A hydropneumatic accumulator according to claim 7 wherein said sensor means comprises first and second proximity switches with centers spaced by a second distance along an axial direction of said tube member, said switch member having an axial length different than said second distance.

9. A hydropneumatic accumulator according to claim 8 wherein said axial length is greater than said second distance.

10. A hydropneumatic accumulator according to claim 6 wherein said filling means is coaxially positioned on an end of said tube member remote from said housing.

* * * * *